United States Patent Office 3,528,675
Patented Sept. 15, 1970

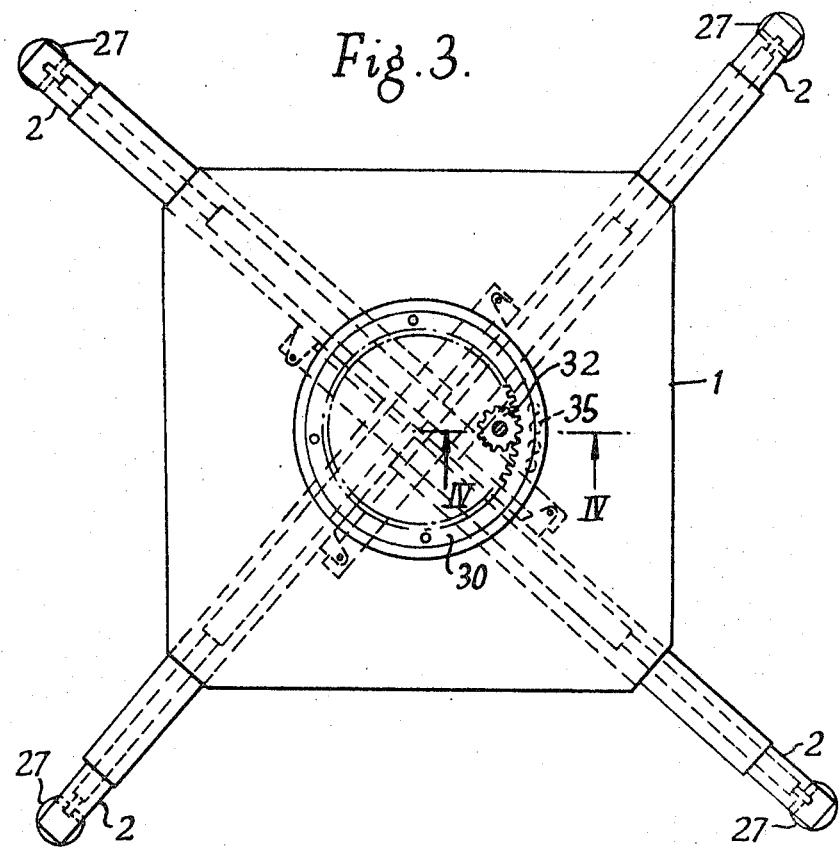
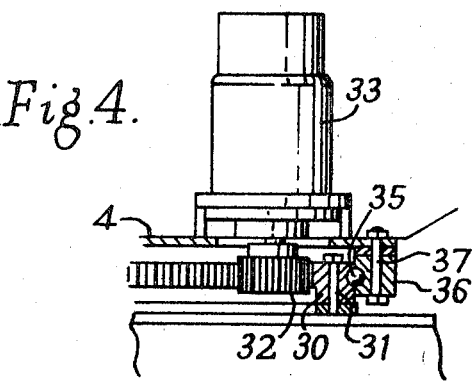

3,528,675
LOAD LIFTING
David J. B. Brown, Stroud, England, assignor to Winget Limited, Rochester, Kent, England
Continuation of application Ser. No. 623,345, Mar. 15, 1967. This application Mar. 19, 1969, Ser. No. 808,705
Claims priority, application Great Britain, Mar. 17, 1966, 11,675/66
Int. Cl. B62d 21/18
U.S. Cl. 280—43.23   3 Claims

ABSTRACT OF THE DISCLOSURE

A vehicle for load lifting comprising a chassis and wheels carried by axles which are mounted for relative movement to the chassis so that the latter may be lowered to rest on a surface on which the vehicle is to operate.

---

This is a continuation of application Ser. No. 623,345 filed Mar. 15, 1967, and now abandoned.

BACKGROUND OF THE INVENTION

Field of the invention

This invention concerns load lifting apparatus and in particular cranes, excavators and the like of the kind adapted to be driven on public highways.

Description of prior art

The type of crane, excavator or the like referred to above usually has its load lifting equipment mounted on a turntable which is itself mounted on a vehicle chassis and consequently when the load lifting equipment is in use it is necessary to stabilise the vehicle chassis by raising it and the road wheels, by jacks. It is also inevitable that, if the operator controls the crane or excavator equipment from the vehicle cab, there will be occasions when he cannot clearly see the jib hook or excavator bucket and this has to be directed by an assistant. It will also be appreciated that the cost of load lifting means of the kind referred to is high and thus it is an object of the present invention to eliminate or substantially eliminate the disadvantages of known load lifting means and at the same time reduce the cost of production thereof.

Summary of the invention

According to the present invention there is provided a load lifting vehicle having a chassis and wheels carried by axles which are mounted on members adapted to raise the axles relative to the chassis to allow the latter to rest on a surface on which the vehicle is to operate.

BRIEF DESCRIPTION OF DRAWINGS

The invention will now be described by way of example with reference to the accompanying drawings in which:

FIG. 3 is a plan view of FIG. 2 as viewed from below; and

FIG. 4 is a section view taken on the line IV—IV of FIG. 3.

DESCRIPTION OF PREFERRED EMBODIMENT

Figure 1:
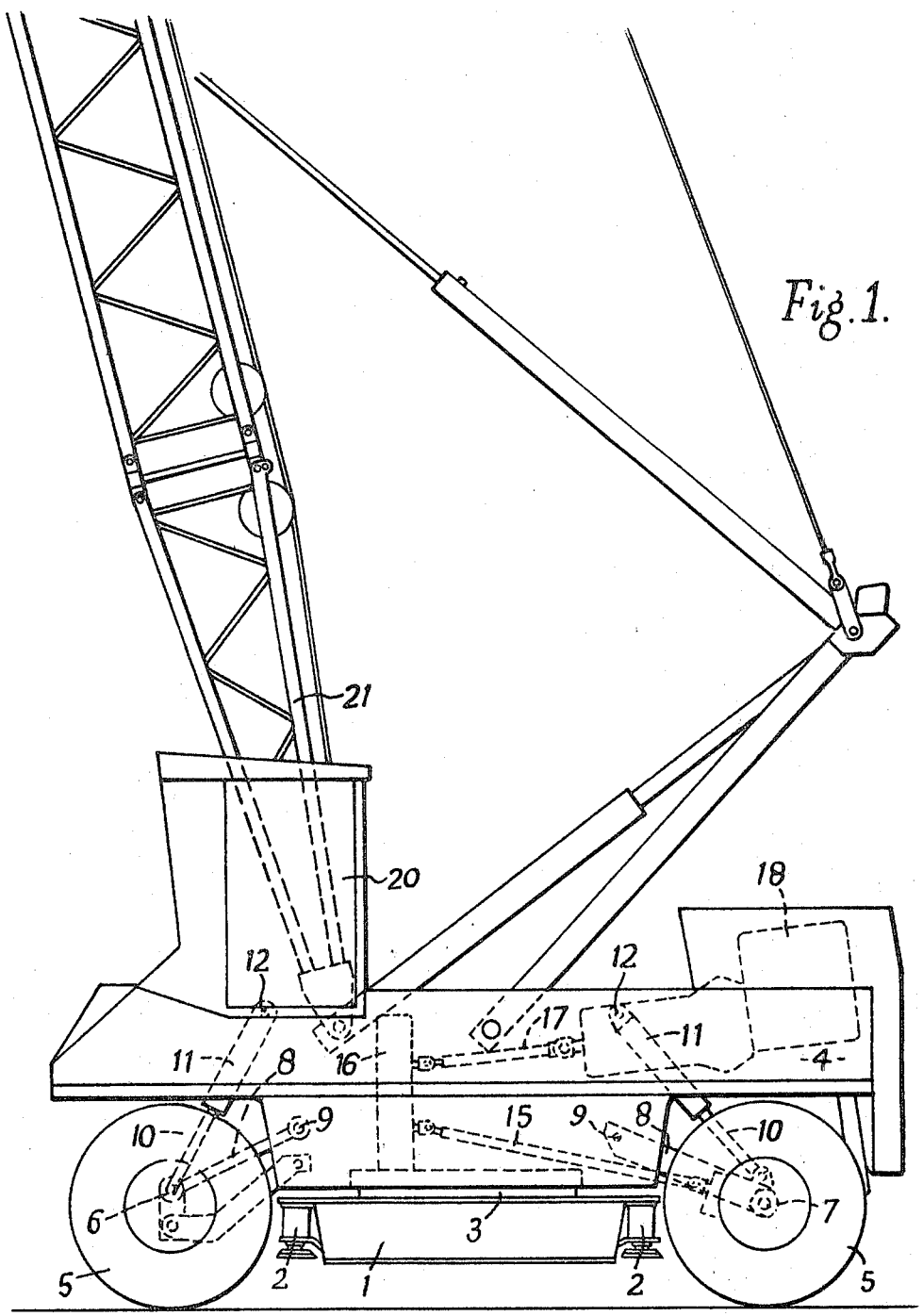
FIG. 1 is a diagrammatic side view of a load lifting vehicle.
Figure 2:
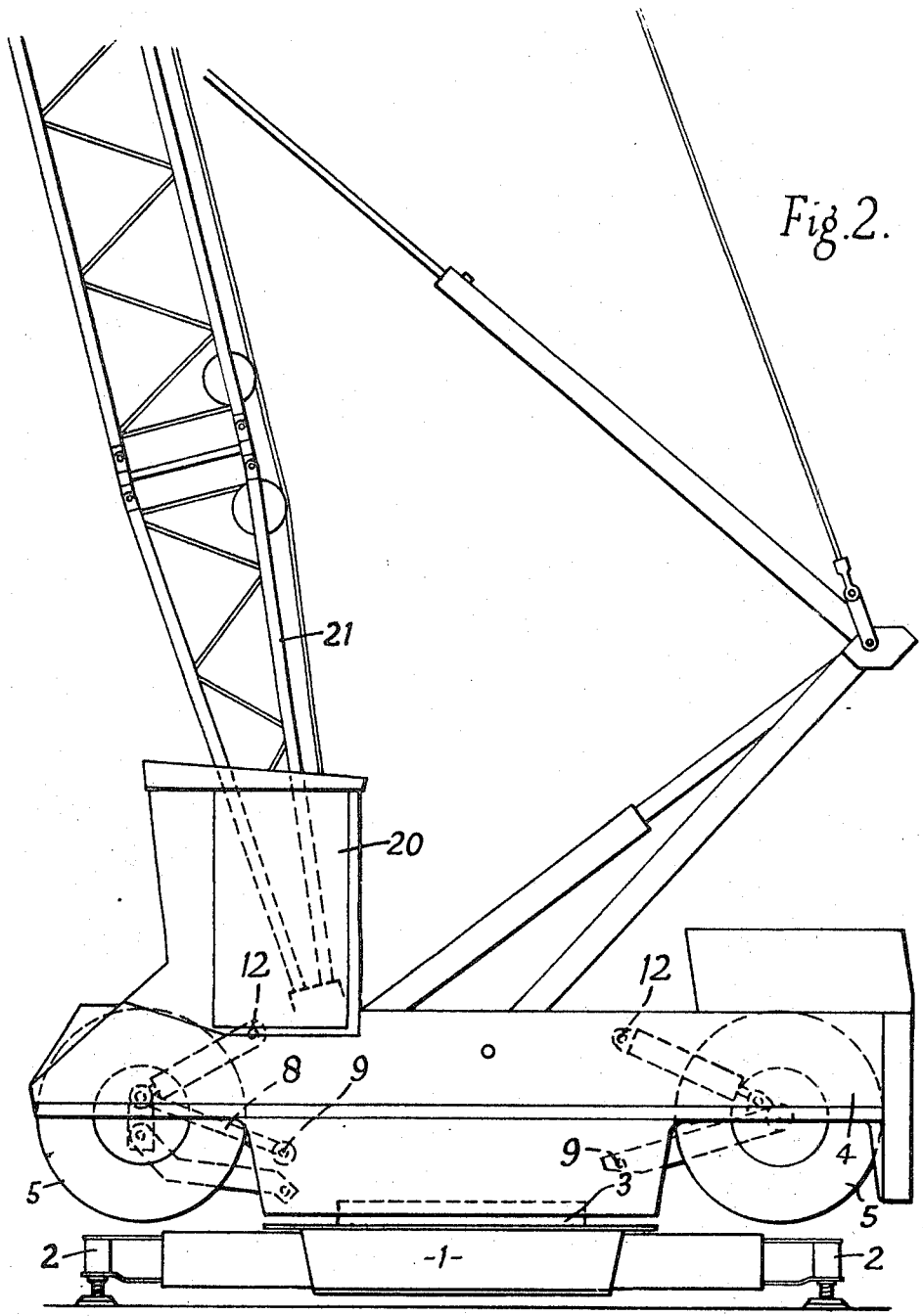
FIG. 2 is a view similar to FIG. 1 but with the road wheels raised with respect of the chassis.

In the drawings there is shown a mobile crane which has a chassis 1 of cruciform configuration provided with four stabiliser arms 2 slidable within the chassis 1. The chassis 1 carries on its upper surface a turntable unit 3 which in turn carries on its upper surface a main frame 4. Wheels 5 are carried by a front axle 6 and a rear axle 7 mounted at the front and at the rear respectively of the main frame 4.

Each end of the each axle 6, 7 is connected to a pivot link 8 and the free end of each link 8 is connected to the main frame 4 by pivot pin 9. Also, each end of each axle is connected to the ram 10 of an hydraulic jack 11. Each end of the front axle 6 is further operatively connected to the main frame 4 by way of a second link parallel to a respective pivot link 8, each said link extending longitudinally of the main frame, forming a parallelogram linkage. The free end of the jack 11 is connected by a pivot pin 12 of the main frame 4.

The rear axle 7 corresponds to the axle described in our copending United States patent application S.N. 623,130 filed Mar. 14, 1967, now Pat. No. 3,469,647. The rear axle 7 is connected by a transmission shaft 15, a gear box 16 and a shaft 17 to a drive motor 18. The upper part of the main frame 4 supports on one side of its longitudinal axis a driver's cab 20 from which the operation of the vehicle is controlled, and a jib 21 as described in our copending U.S. patent application S.N. 623,344 filed Mar. 15, 1967, now Pat. No. 3,430,778.

The chassis 1 is so arranged that two stabiliser arms 2 project from each side of the chassis 1 between the front and rear axles 6 and 7, respectively, when in the extended position. At the free ends of the arms 2 are internally threaded mountings 25. Levelling legs 26 having corresponding threads to the mountings 25 engage within the mountings 25 and levelling pads 27 are carried by the lower part of the legs 26. The pads 27 may be connected to the legs 26 (by universal couplings) to provide for angular adjustment of the pads 27.

The turntable unit 3 carried on the upper surface of the chassis 1 includes a ring gear 30 (FIG. 4) which is bolted to the top of the chassis 1 by bolts 31. A pinion 32 driven by a slew motor 33 carried by the main frame 4 engages the ring gear 30. The main frame 4 is connected to the turntable by a ring bearing 35 located between the ring gear 30 and a housing 36 connected to the main frame 4 by bolts 37. On rotation of the pinion 31 the main frame is driven together with the jib 21 and associated components in any required position through 360° about the chassis 1.

In use, when it is required to use the apparatus the stabiliser arms 2 are moved outwardly from the chassis 1 by hydraulic pressure supplied from a reservoir (not shown) carried by the main frame 4 and the height of the levelling legs 26 are adjusted. The apparatus is then lowered on to the levelling legs 26 by raising the axles 6, 7 carrying the wheels 5 by means of retracting the hydraulic rams 10 into the jacks 11 by hydraulic pressure. If it is required to rotate the main frame 4 the slew motor 32 is operated to rotate the pinion 32 about the ring gear 30.

The hydraulic jacks act as shock absorbers for the axles during movement of the vehicle from place to place by ensuring that the cylinders contain a predetermined quantity and pressure of hydraulic fluid.

For safety precautions it will be appreciated that cut-out safety devices (not shown) may be included so that the axles cannot be retracted inadvertently when the vehicle is being driven from place to place and similarly they cannot be raised when the vehicle is in use.

In use on soft ground the pads may be pressed into the ground and in which case the base of the chassis will rest on the ground and thus assist in spreading the load.

It will be appreciated that the driving cab of this crane is mounted on the turntable and contains not only the controls for the crane but also the controls necessary for driving the crane from place to place.

It will also be appreciated that since the controls for the crane are mounted in the cab that whatever position the crane is operating in the driver is always facing towards the end of the jib of the crane and therefore has a clear view of the position of the load being carried by the crane.

It will also be appreciated that the turning circle for the crane will be very small compared with a normally constructed crane since by rotating the turntable by increments of 90° with the base resting on the ground the crane can be driven off (after raising the base) at 90° to the direction from which it came without the necessity for turning maneuvers being carried out as is normally necessary. This means that a crane with for example a 9-foot tail radius can have an 18-foot turning circle.

Although reference has been made to our copending patent application S.N. 623,344, it will be appreciated that the arrangement described above can be used for cranes of many different types and also for excavators and the like, where it is necessary to enable load lifting means to be rotatable and to be firmly located on the ground and stable in all positions of the load lifting means.

What is claimed is:

1. In a load lifting vehicle, a chassis including a turntable unit and a stabilizer unit, bearing means interconnecting said units, a first wheel axle, wheels carried by said axle, a pair of spaced parallel link arms extending longitudinally of said chassis interconnecting said axle and said turntable unit to provide vertical movement of said axle without rotation about a longitudinal axis thereof relative to said chassis, a second wheel axle, wheels carried by said axle, a connecting link arm interconnecting said axle and said turntable unit providing oscillatory vertical movement of said axle through an arc relative to said chassis, stabilizer arms carried by said stabilizer unit for resting on a surface on which said vehicle is to operate, and hydraulic cylinders interconnecting said chassis and said axles for pivoting said link arms to raise and lower said axles independently of each other relative to said chassis.

2. In a load lifting vehicle, a chassis including a turntable unit and a stabilizer unit, bearing means interconnecting said units, wheel axles, wheels carried by said axles, link arms pivotally interconnecting said axles and said turntable unit, stabilizer arms carried by said stabilizer unit for supporting said vehicle on a surface on which said vehicle is to operate, said stabilizer arms being arranged in cruciform configuration supported diagonally from said chassis, a pair of said arms extending out each side at an angle intermediate the longitudinal and transverse axis of the chassis, and hydraulic cylinders interconnecting said chassis and said axles for pivoting said link arms to raise and lower said axles and wheels relative to said chassis into and out of engagement with the surface on which said vehicle is to operate, said stabilizer arms being slideably movable substantially perpendicular to the vertical axis of the vehicle betwen a retracted and an extended position, and means for retracting and extending said stabilizer arms.

3. A load lifting vehicle as set forth in claim 1 wherein said hydraulic jacks contain a predetermined quantity and pressure of hydraulic fluid so as to act as shock absorbers for the associated axle during movement of the vehicle.

References Cited

UNITED STATES PATENTS

| | | | |
|---|---|---|---|
| 2,459,753 | 1/1949 | Brown | 280—43.23 |
| 2,476,825 | 7/1949 | Allen | 280—43.23 |
| 2,974,972 | 3/1961 | Hassell | 280—43.23 |
| 3,073,458 | 1/1963 | Wieschel | 212—145 |
| 3,142,395 | 7/1964 | Pingon | 280—43.23 |

LEO FRIAGLIA, Primary Examiner

R. R. SONG, Assistant Examiner

U.S. Cl. X.R.

212—145; 280—145